(12) United States Patent
Huang

(10) Patent No.: US 12,530,230 B2
(45) Date of Patent: Jan. 20, 2026

(54) MEMORY OPERATING-FREQUENCY ADJUSTMENT METHOD, SMART TERMINAL, AND STORAGE MEDIUM

(71) Applicant: SHENZHEN TCL NEW TECHNOLOGY CO., LTD., Guangdong (CN)

(72) Inventor: Zhaowen Huang, Guangdong (CN)

(73) Assignee: SHENZHEN TCL NEW TECHNOLOGY CO., LTD., Guangdong (CN)

( * ) Notice: Subject to any disclaimer, the term of this patent is extended or adjusted under 35 U.S.C. 154(b) by 585 days.

(21) Appl. No.: 18/002,214

(22) PCT Filed: Jul. 8, 2021

(86) PCT No.: PCT/CN2021/105348
§ 371 (c)(1),
(2) Date: Dec. 16, 2022

(87) PCT Pub. No.: WO2021/254526
PCT Pub. Date: Dec. 23, 2021

(65) Prior Publication Data
US 2023/0244529 A1    Aug. 3, 2023

(30) Foreign Application Priority Data
Jun. 16, 2020  (CN) .......................... 202010550270.5

(51) Int. Cl.
*G06F 9/50* (2006.01)
(52) U.S. Cl.
CPC .................. *G06F 9/5016* (2013.01)
(58) Field of Classification Search
CPC ............... G06F 9/5016; G06F 13/1689; G06F 9/30189; G11C 7/22; G11C 11/4076; Y02D 10/00
See application file for complete search history.

(56) References Cited

U.S. PATENT DOCUMENTS

| 6,792,561 | B1 | 9/2004 | Mamata |
| 2007/0103836 | A1* | 5/2007 | Oh .................. G06F 1/3203 361/115 |

(Continued)

FOREIGN PATENT DOCUMENTS

| CN | 102073504 A | 5/2011 |
| CN | 102402454 A | 4/2012 |

(Continued)

OTHER PUBLICATIONS

International Search Report in International application No. PCT/CN2021/105348, mailed on Oct. 9, 2021.

(Continued)

*Primary Examiner* — Peng Ke
(74) *Attorney, Agent, or Firm* — PV IP PC; Wei Te Chung

(57) ABSTRACT

Disclosed by the present application are a memory operating-frequency adjustment method, intelligent terminal, and storage medium, comprising: according to operation information of the intelligent terminal, determining memory read/write data of a terminal system; determining the operating mode of the memory according to the memory read/write data; adjusting the operating frequency of the memory according to the operating mode. In the present application, the operating mode of the memory is determined according to the memory read data of the terminal system, and the operating frequency of the memory is adjusted according to the operating mode, improving memory utilization.

19 Claims, 3 Drawing Sheets

(56) References Cited

U.S. PATENT DOCUMENTS

| | | |
|---|---|---|
| 2013/0166832 A1 | 6/2013 | Peng et al. |
| 2013/0283001 A1 | 10/2013 | Ishikawa |
| 2015/0026398 A1 | 1/2015 | Kim |
| 2015/0278091 A1 | 10/2015 | Wilkerson et al. |
| 2017/0017587 A1* | 1/2017 | West ................ G06F 13/4068 |
| 2019/0065752 A1* | 2/2019 | Li ...................... G06F 1/3296 |
| 2019/0087299 A1 | 3/2019 | Yasuda et al. |
| 2020/0159410 A1 | 5/2020 | Rayaprolu et al. |
| 2020/0393995 A1* | 12/2020 | Jung ................. G06F 1/3275 |
| 2021/0271613 A1* | 9/2021 | Chen ................ G06F 13/1689 |

FOREIGN PATENT DOCUMENTS

| | | |
|---|---|---|
| CN | 107562470 A | 1/2018 |
| CN | 109062715 A | 12/2018 |
| CN | 109343954 A | 2/2019 |
| CN | 109471716 A | 3/2019 |
| CN | 110851273 A | 2/2020 |
| CN | 110928736 A | 3/2020 |
| JP | 2007287020 A | 11/2007 |
| JP | 2009163582 A | 7/2009 |
| JP | 2019053522 A | 4/2019 |

OTHER PUBLICATIONS

Written Opinion of the International Search Authority in International application No. PCT/CN2021/105348, mailed on Oct. 9, 2021.

European Search Report in European application No. 21826396.0, mailed on Jun. 20, 2024.

Chinese Office Action issued in corresponding Chinese Patent Application No. 202010550270.5 dated Dec. 21, 2024, pp. 1-12.

NPL1:"Computer Assembly·System Installation. Daily Maintenance and Troubleshooting" edited by Yixian Culture, China Railway Publishing House, p. 67, ISBN 978-7-113-20439-6.

Japanese Office Action issued in corresponding Japanese Patent Application No. 2022-574566 dated Jan. 7, 2025, pp. 1-3.

* cited by examiner

MEMORY OPERATING-FREQUENCY ADJUSTMENT METHOD, SMART TERMINAL, AND STORAGE MEDIUM

CROSS REFERENCE TO RELATED APPLICATIONS

This application is a US national phase application based upon an International Application No. PCT/CN2021/105348, filed on Jul. 8, 2021, which claims priority to Chinese Application No. 202010550270.5, filed on Jun. 16, 2020. The entire disclosures of the above application are incorporated herein by reference.

FIELD OF THE DISCLOSURE

The present disclosure relates to a technical field of memory control, in particular to a method of adjusting operating frequency of a memory, an intelligent terminal and a storage medium.

BACKGROUND

With the development of embedded devices, embedded systems have higher and higher requirements for device hardware. Nowadays, performance, cost and power consumption of chips are considered so that memory chips are integrated into the chip. However, due to the demand for capacity and performance, in the actual application, a combination of memory chips of different frequencies will be used.

SUMMARY

Technical Problem

In the existing technology, when the terminal system is running, the memory read and write operations will be carried out at the frequency corresponding to the memory chip with low frequency, so the performance of the memory chip with high frequency is not fully utilized, resulting in inefficient memory utilization and waste of memory resources. Therefore, existing technologies need to be improved and developed.

Technical Solution

Embodiments of the present disclosure is directed to a method of adjusting operating frequency of a memory, an intelligent terminal and a storage medium to solve the problem of inefficient memory utilization and waste of memory resources in the prior art.

In a first aspect, an embodiment of the present disclosure is directed to a method of adjusting operating frequency of a memory. The method includes:
  determining memory access data of a terminal system according to an operation information of an intelligent terminal, wherein the operation information indicates information generated by the terminal system during operation, and the memory access data indicates an access speed of the terminal system to the memory;
  determining an operating mode of the memory according to the memory access data; and
  adjusting the operating frequency of the memory according to the operating mode.

In one embodiment, the determining memory access data of the terminal system according to the operation information of the intelligent terminal, comprises:
  acquiring the operation information of the intelligent terminal;
  according to the operation information, acquiring a running system task of the terminal system, wherein the system task includes any one or more of application programs, service processes or system functions;
  determining a memory access speed data of the terminal system according to the system task.

In one embodiment, the determining the memory access speed data of the terminal system according to the system task comprises:
  obtaining, according to the system task, a peak access speed data corresponding to the system task and the terminal system at startup, wherein the peak access speed data indicates a maximum access speed of the system task and the terminal system to the memory at startup;
  obtaining a transient access speed data of the system task to the memory when the terminal system executes the system task; and
  determining the memory access data according to the peak access speed data and the transient access speed data.

In one embodiment, the determining the memory access data according to the peak access speed data and the transient access speed data comprises:
  summing the peak access speed data and the transient access speed data to obtain the memory access data.

In one embodiment, the obtaining, according to the system task, the peak access speed data corresponding to the system task and the terminal system at startup, comprises:
  obtaining a preset memory access data table that records peak access speed data corresponding to the application programs, peak access speed data corresponding to the service processes, peak access speed data corresponding to the system functions, and peak access speed data corresponding to the terminal systems;
  acquiring the peak access speed data corresponding to the system tasks and the terminal systems from the memory access data table.

In one embodiment, the acquiring the peak access speed data corresponding to the system tasks and the terminal systems from the memory access data table comprises:
  matching the system task with the memory access data table and matching the terminal system with the memory access data table; and
  acquiring the peak access speed data corresponding to the application program, the service process or the system function in the system task, and the peak access speed data corresponding to the terminal system.

In one embodiment, the determining the memory access data according to the peak access speed data and the transient access speed data comprises:
  summing the peak access speed data and the transient access speed data to obtain the memory access data.

In one embodiment, before acquiring the preset memory access data table, further comprising:
  reading the peak access speed data of the terminal system to the memory, the peak access speed data of each application program and each service process in the terminal system, and the peak access speed data of the terminal system to the memory when the system function of the terminal system starts;

recording the peak access speed of the terminal system to the memory, the peak access speed data of each application program and each service process in the terminal system, and the peak access speed data of the terminal system to the memory when the system function of the terminal system starts, to form the memory access data table.

In one embodiment, the determining an operating mode of the memory according to the memory access data comprises:
obtaining a same frequency bandwidth peak speed data that indicates the transient access speed of different types of memory chips in the memory under the same frequency;
comparing the memory access data with the same frequency bandwidth peak speed data to determine the operating mode of the memory according to a comparison result.

In one embodiment, the comparing the memory access data with the same frequency bandwidth peak speed data to determine the operating mode of the memory according to the comparison result, comprises:
when the memory access data is greater than the same frequency bandwidth peak speed data, setting the operating mode of the memory to a different frequency operating mode; and
when the access data of the memory is less than the peak speed data of the same frequency bandwidth, setting the operating mode of the memory the same frequency operating mode.

In one embodiment, the adjusting the operating frequency of the memory according to the operating mode comprises:
obtaining frequencies corresponding to all memory chips in the memory, and determining a lowest frequency from the frequencies corresponding to all memory chips as the operating frequency of the memory, when the operating mode of the memory is the same frequency operating mode; and
controlling all memory chips in the memory to utilize their corresponding frequency as the operation frequency, when the operating mode of the memory is the different-frequency operating mode.

In one embodiment, the memory comprises a first model memory chip and a second model memory chip, and a frequency of the first model memory chip is lower than that of the second model memory chip;
when the obtaining frequencies corresponding to all memory chips in the memory, and determining a lowest frequency from the frequencies corresponding to all memory chips as the operating frequency of the memory, when the operating mode of the memory is the same frequency operating mode, comprises:
when the operating mode of the memory is the same frequency operating mode, controlling the first model memory chip and the second model memory chip to operate at the operating frequency that is the frequency of the first model memory chip.

In one embodiment, the controlling all memory chips in the memory to utilize their corresponding frequency as the operation frequency, when the operating mode of the memory is the different-frequency operating mode comprises:
when the operating mode of the memory is the different-frequency operating mode, controlling the first model memory chip and the second model memory chip to operate with their corresponding frequency as the operating frequency.

In a second aspect, another embodiment of the present disclosure is directed to an intelligent terminal comprising a memory and one or more program instructions. The one or more program instructions stored in the memory are executed by one or more processors to perform the method as provided above.

In a third aspect, another embodiment of the present disclosure is directed to a non-transitory computer-readable storage media, storing program instructions executable by a processor of an electronic device to perform the method as provided above.

Advantageous Effect

The present embodiment determines the memory access data of the terminal system according to the operation information of the intelligent terminal. Since the operation information reflects the information generated by the terminal system in the process of operation, it is possible to determine the access speed of the terminal system to the memory during the operation according to the operation information, that is, the memory access data is obtained. Then according to the memory access data, determine the operating mode of the memory, and finally adjust the operating frequency of the memory according to the memory operating mode. Since the operating mode in the present embodiment is determined based on the memory access data, and the memory access data is obtained based on the operation information of the intelligent terminal, it can be seen that the operating mode in the present embodiment is determined according to the operation information generated by the terminal system in the actual operation process. In this way, the operating frequency of the memory is adjusted according to the operating mode, as well as the operating frequency of the memory is adjusted according to the operation information, so as to achieve the effect of dynamically adjusting the operating frequency of the memory, so as to exert the maximum performance of the memory and improve the utilization efficiency of the memory.

BRIEF DESCRIPTION OF THE DRAWINGS

The following combined with the accompanying drawings, by describing in detail the specific embodiments of the present disclosure, will make the technical solution of the present disclosure and its beneficial effects obvious.

DETAILED DESCRIPTION

Figure 1:
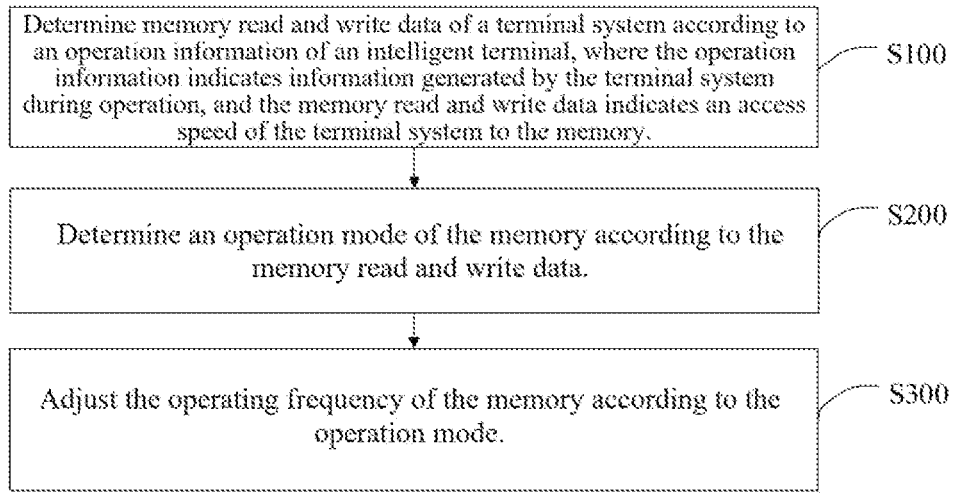
FIG. 1 is a flowchart of a method of adjusting operating frequency of a memory according to an embodiment of the present disclosure.

In order to make the purpose, technical solution and advantages of the present disclosure clearer and clearer, the present disclosure is further described in detail with reference to the accompanying drawings and examples of embodiments. It should be understood that the specific embodiments described herein are only used to interpret the present disclosure and are not intended to qualify the present disclosure.

It should be noted that if the present disclosure embodiments involve directional instructions (such as up, down, left, right, front, back . . . ), the directional indication is only used to explain the relative position relationship between the components under a particular attitude (as shown in the accompanying drawings), motion, etc. If the specific attitude changes, the directional indication also changes accordingly.

Researchers have found that with the development of embedded devices, embedded systems have higher and higher requirements for device hardware. Nowadays, since many chips are considered for performance, cost and power consumption, memory chips are integrated into the chip. However, due to the demand for capacity and performance, in the actual application, a combination of memory chips of different frequencies will be used. For example, the maximum capacity of memory chips with model DDR3 is 512 Megabytes, and in the actual application, memory chips with external model DDR4 or memory chips of other models may be selected. It may also be a combination of memory chips with built-in model DDR3-2133 and memory chips with add-in model DDR4-2666, so that there is a combination of memory chips of different frequencies. In the existing technology, when the terminal system is running, it will perform memory read and write operations at the frequency corresponding to the memory chip with low frequency, so the performance of the memory chip with high frequency is not fully utilized, resulting in inefficient memory utilization and waste of memory resources. For example, when there is a combination of memory chips with model DDR3-2133 and memory chips with add-in model DDR4-2666, the terminal system uses the frequency corresponding to the memory chips of model DDR3-2133 to access to all memory chips, so that the memory chips of model DDR4-2666 cannot exert maximum performance, resulting in waste of resources.

In order to solve the problem, the present embodiment provides a method of adjusting operating frequency of a memory. Through the method of adjusting operating frequency of a memory in the present embodiment, the performance of the memory can be maximized and the memory utilization efficiency can be improved. Specifically, the present embodiment determines the memory access data of the terminal system according to the operation information of the intelligent terminal. Since the operation information represents the information generated by the terminal system during operation, the access speed of the terminal system to the memory during operation can be determined according to the operation information. That is, the memory access data can be obtained. Then, the operating mode of the memory is determined according to the memory access data. The operating frequency of the memory is adjusted according to the operating mode. Since the operating mode is determined based on the memory access data which is obtained based on the operation information of the intelligent terminal, the operating mode in the present embodiment is determined according to the operation information generated by the terminal system in the actual operation process. In this way, the operating frequency of the memory is adjusted according to the operating mode, so that the operating frequency of the memory is adjusted according to the operation information, so as to achieve the effect of dynamically adjusting the operating frequency of the memory. Compared with the terminal system in the prior art to perform memory read and write operations at a frequency corresponding to the memory chip with a low frequency, the present embodiment can maximize performance of the memory and improve the efficiency of memory utilization.

For example, when the intelligent terminal obtains operation information during operation, and then obtains access speed of the terminal system to the memory according to the operation information. That is, the memory access data of the terminal system is obtained. Then, according to the memory access data, the operating mode of the memory is determined, such as synchronization operating mode or asynchronous operating mode. Finally, the operation frequency of the memory is adjusted based on the operating mode. For example, if the memory is a combination of DDR3-2133 model memory chip and external DDR4-2666 model memory chip, the memory access data can be obtained based on the operation information, and then the operating mode can be determined. The operation frequencies of the DDR3-2133 model memory chip and the external DDR4-2666 model memory chip are adjusted based on the mode, so as to maximize the performance of the DDR3-2133 model memory chip and the external DDR4-2666 model memory chip, and improve the resources utilization rate.

Exemplary Method:

In the embodiment of the present disclosure, a method of adjusting an operation frequency of a memory applied to the intelligent terminal as shown in FIG. 1 is provided. The method includes steps S100, S200, and S300.

At step S100, according to the operation information of the intelligent terminal, the memory access data of the terminal system is determined. The operation information indicates the information generated by the terminal system during operation, and the memory access data indicates the access speed of the terminal system to the memory.

Since the intelligent terminal generates operation information during the running process, the operation information indicates the information generated during the running process of the intelligent terminal and the process of executing system tasks. The operation information can be storage memory data occupied by the intelligent terminal during operation. The operation information can be a certain application program when the intelligent terminal is running, the name information of the application program, the access data of the application program to the memory, and the operation record data of the application program, etc. Therefore, according to the operation information, it can be determined what system task the intelligent terminal is executing at this time. For example, after analyzing the operation information, it is found that the chat record data of WeChat application is constantly increasing. Through these chat record data, it can be determined that the system task currently being executed by the intelligent terminal is to run WeChat application. When the intelligent terminal executes the system task, it will access the memory. Therefore, the intelligent terminal can obtain the memory access data of the terminal system in the process of executing the system task.

The memory access data is the data when the terminal system reads and writes to the memory. Therefore, the memory access data indicate the access speed of the terminal system to the memory. For example, when an intelligent terminal enables an application, it will generate operation information about enabling the application. The operation information includes the memory access data of the terminal system when enabling the application and the subsequent running of the application. Therefore, according to the operation information, the memory access data can be acquired.

Figure 2:
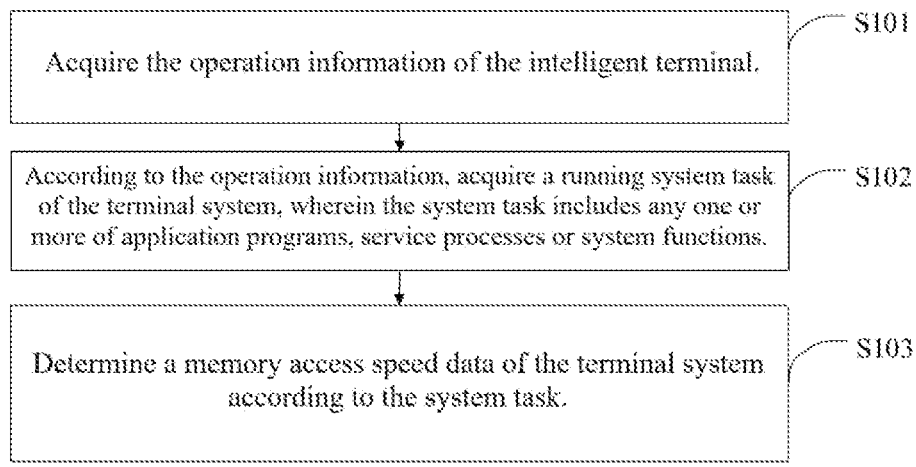
FIG. 2 is a flowchart of the process of obtaining memory access data in the method of adjusting operating frequency of the memory provided by the embodiment of the present disclosure.

In one embodiment, as shown in FIG. 2, the step of acquiring memory access data includes steps S101, S102, and S103.

At step S101, the operation information of the intelligent terminal is acquired.

At step S102, the running system tasks of the terminal system according to the operation information is acquired. The system tasks include any one or more of application programs, service processes or system functions.

At step S103, the memory access speed data of the terminal system is determined according to the system task.

Specific embodiment, because the memory access data of the terminal system is related to the operation information of the intelligent terminal, so the present embodiment first needs to obtain the operation information of the intelligent terminal, and then obtain the system task that the intelligent terminal is performing according to the operation information, because the intelligent terminal will read and write the memory when performing the system task, so the present embodiment can obtain the memory access speed data of the terminal system according to the system task. In one embodiment, the system task includes any one or more of the application, service process, or system function, that is, the intelligent terminal may be performing not only one system task at this time, there may be a variety. For example, intelligent terminals (such as mobile phones) are running WeChat and NetEase Cloud Music, that is, users use NetEase Cloud Music to listen to songs while using WeChat to chat with friends. In addition, the background of the intelligent terminal is also running the GPS positioning service, which obtains the location information of the intelligent terminal in real time. It can be seen that the system tasks being performed by the intelligent terminal include at least WeChat application, NetEase Cloud Music and GPS positioning services. When the intelligent terminal performs these system tasks, the terminal system needs to read and write operations on the memory in order to store the data.

Since the memory access data of the terminal system includes data with multiple dimensions, in order to determine the operating mode of memory more accurately based on memory access data in subsequent steps The present embodiment requires accurate acquisition of memory access data. Specifically, the terminal system itself will access to the memory during the running process, and the system task itself will access to the memory after it is started. For example, WeChat itself will access to the memory when it is running to save data. In addition, when the terminal system executes system tasks, system tasks will perform read and write operations on the memory, such as WeChat application will open the camera function during operation, and the camera function will read and write to the memory. It can be seen that the memory access data in the present embodiment includes data that the terminal system itself reads and writes to the memory when it starts, the data that reads and writes to the memory when the system task starts, and obtains the data of the system task access to the memory when the terminal system performs the system task.

In one embodiment, the present embodiment is to improve the resource utilization of the memory by adjusting the operating frequency of the memory, and the operating frequency of the memory is generally measured based on the access speed of the memory. In general, the faster the access speed to the memory, the higher the required operating frequency. Therefore, in order to adjust the operating frequency more accurately, the present embodiment obtains the memory read speed when acquiring memory read data. Specifically, after determining the system task, the present embodiment firstly, according to the system task, obtains the system task and the terminal system itself at the startup of the corresponding peak access speed data. Then, obtain the instantaneous access speed data of the system task to memory when the end system performs the system task. Finally, the memory access data is determined based on the peak access speed data and the instantaneous access speed data. In other words, the memory access data includes the peak access speed data when the terminal system starts, the read and write peak speed data when the system task starts, and the instantaneous access speed data when the system task is executed.

Figure 6:
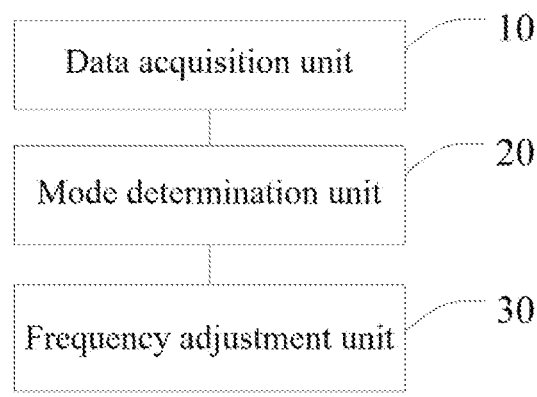
FIG. 6 is a block diagram a device for adjusting an operating frequency of a memory according to another embodiment of the present disclosure.

When specifically applied, when obtaining the system task and the peak access speed data corresponding to the terminal system startup in the present embodiment, it is mainly by obtaining a preset memory access data table. The memory access data table is established in advance based on the system tasks and the end system's access data to memory. Therefore, the memory data table stores the peak access speed data corresponding to the system task and the read and write peak speed data corresponding to the terminal system, that is, according to the memory data table, the highest access data of each system task to the memory and the highest access data of the terminal system to the memory can be determined. And because system tasks include: any one or more of the applications, service processes, or system functions. Therefore, the memory access data table stores the read and write peak speed data corresponding to the application, the read and write peak speed data corresponding to the service process, the read and write peak speed data corresponding to the system function, and the read and write peak speed data corresponding to the terminal system. In one embodiment, the memory access data table is pre-set and can be called at any time. When setting the memory access data table, as shown in FIG. 6, the present embodiment uses the CPU to read the peak speed of the terminal system to the memory read and write by the memory controller in the memory control module (i.e., obtain the peak access speed data corresponding to the terminal system), and the maximum access speed of each application, service process and system function at the start of the memory (i.e., obtain the system corresponding to the peak access speed data), and record it to form a memory access data table, as shown in Table 1 below, Table 1 includes data for system tasks (that is, any one or more of the applications, service processes, or system functions) and the corresponding peak access speeds of the end system.

TABLE 1

| Serial number | Name | Peak access speeds |
|---|---|---|
| 1 | End system | 4520 MB/s |
| 2 | Communication Services | 20 MB/s |

TABLE 1-continued

| Serial number | Name | Peak access speeds |
|---|---|---|
| 3 | GPS location services | 42 MB/s |
| 4 | WeChat app | 12 MB/s |
| 5 | NetEase Cloud Music | 5 MB/s |
| ... | ... | ... |
| n | xx features | 35 MB/s |

Therefore, after obtaining the system task being executed by the intelligent terminal, the system task can be matched with the memory access data table, and the terminal system can be matched with the memory access data table. In this embodiment, the data processing module queries the memory access data table (the table 1) according to the system task to determine the peak access speed data corresponding to the system task (that is, the application program, service process or system function), and then reads from the memory to obtain the corresponding peak access speed data when the terminal system starts. For example, upon the system tasks being executed in the intelligent terminal are WeChat application, NetEase Cloud Music application, and GPS positioning services, then according to the Table 1, the peak access speed data corresponding to WeChat applications can be obtained as 12 MB/s, NetEase Cloud Music application corresponds to the peak access speed data can be obtained as 5 MB/s, the peak access speed data corresponding to the GPS positioning service can be obtained as 42 MB/s, and the peak access speed data corresponding to the terminal system can also be obtained as 4520 MB/s.

After obtaining the peak access speed data corresponding to the terminal system and the system tasks, the transient access data of the system task to the memory is obtained when the terminal system is executing the system task. Specifically, as shown in FIG. 6, the CPU can also control the memory controller of the memory controlling module to read the transient access speed data of the system task during operation. The transient access speed of the system task to the memory may vary due to the speed of the bandwidth, so the transient access speed data is collected in real-time. For example, when WeChat application enables the camera function, the camera function will perform access operations on the memory. At this time, the transient access speed data on the memory can be obtained. The transient access speed data indicates the transient access speed to the memory.

After obtaining the peak access speed data and the transient access speed data, the memory access data includes a sum of the peak access speed data and the transient access speed data. For example, if the peak access speed data corresponding to the terminal system is S1, the peak access speed data corresponding to the system task is S2, and the transient access speed data during the operating of the system task is S3, then the memory access data is S=S1+S2+S3.

At step S200, the operating mode of the memory is determined according to the memory access data.

In the specific implementation, after obtaining the memory access data, the memory access data is analyzed to determine the operation mode of the memory. The operating mode of the memory indicates which frequency is used as the operation frequency for the memory to work. The operating mode of the memory includes the same frequency operation mode and the different frequency operating mode. The same frequency operating mode means that all memory chips in the memory use the same frequency as the operation frequency. The different frequency operating mode is that the memory chips use their corresponding frequency as its operation frequency. In this embodiment, the purpose of determining the operating mode of the memory is to perform adaptation on the operating mode of the memory according to the operating mode, so as to maximize the performance of the memory and improve the utilization rate of resources. As for the operating mode of the memory, it includes the same frequency working mode and the different frequency working mode.

Figure 3:
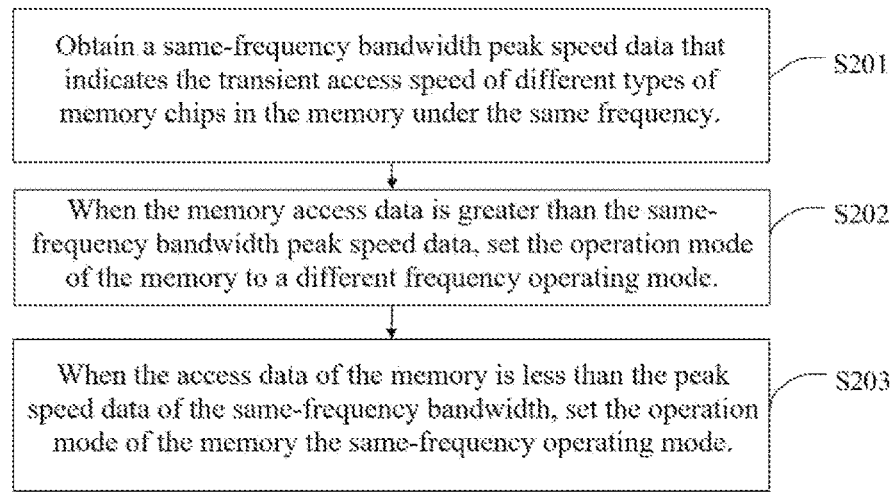
FIG. 3 is a flowchart of the process for determining the operating mode in the operating frequency adjustment method of the memory provided by the embodiment of the present disclosure.

In one embodiment, as shown in FIG. 3, step S200 includes steps S201, S202 and S203.

At step S201, the predetermined same frequency bandwidth peak speed data indicating to the transient access speed of different types of memory chips in the memory under the same frequency is obtained.

At step S202, when the memory access data is greater than the same frequency bandwidth peak speed data, the operating mode of the memory is set as a different-frequency operating mode.

At step S203, when the memory access data is less than the peak speed data of the bandwidth of the same frequency, the operating mode of the memory is set as the same frequency operating mode.

During implementation, after determining the memory access data, the memory access data is compared with the same frequency bandwidth peak speed data, so as to determine the operating mode of the memory according to the comparison result. In one embodiment, the same frequency bandwidth peak speed data is preset and can be retrieved at any time. The same frequency bandwidth peak speed data indicates the transient access speed of different types of memory chips in the memory under the same frequency. The same frequency bandwidth peak speed data in this embodiment is used to measure and determine whether the memory is operated under the same frequency operating mode or the different-frequency operating mode. Specifically, in this embodiment, the CPU schedules the startup and exit of all application programs or service processes, and reads the bandwidth data of the memory by controlling the memory controller. Since there may be a plurality of memory chips in the memory, the memory controller obtains the transient access speeds of different memory chips when the application program or service process starts and exits, and sets these memory chips to operate in the same frequency mode. In this way, the bandwidth peak speed of the memory in the same frequency operating mode is obtained, that is, the same frequency bandwidth peak speed data is obtained. If the memory access data is greater than the same frequency bandwidth peak speed data, it means that the application program or service process running in the intelligent terminal requires a large demand for memory resources. When the same frequency operating mode is adopted, the terminal system will perform access operations to the memory at the lowest frequency of the memory chip in the memory, so that the other memory chips in the memory cannot exert the maximum performance, which will lead to waste of memory resources. In order to solve this problem, in this embodiment, the operating mode of the memory is set as a different frequency operating mode when the memory access data is greater than the same frequency bandwidth peak speed data, so that the memory chips in the memory can work with different operation frequencies, so as to maximize performance. If the memory access data is less than the same frequency bandwidth peak speed data, it means that the application program or service process running in the intelligent terminal does not require a large demand for memory resources, so that the operating mode of the memory is set to the same frequency working mode. That is, all memory chips in the memory work with the same work frequency.

For example, when the memory access data is 5532M/s, and the same frequency bandwidth peak speed data is 4509M/s, it means that the memory access data is greater than the same frequency bandwidth peak speed data, and the operating mode of the memory is set to the different frequency operating mode. And when the memory access data is 4032M/s, it means that the memory access data is smaller than the same frequency bandwidth peak speed data, and the operating mode of the memory is set to the same frequency operating mode.

At step S300, the operation frequency of the memory is adjusted according to the operating mode.

Because the operating mode in this embodiment is determined based on the memory access data, and the memory access data is determined based on the operation information generated by the terminal system during actual operation. Therefore, the operation frequency of the memory is adjusted according to the operating mode which is determined according to the operation information, so that the operation frequency of the memory can be dynamically adjusted, maximizing performance of the memory and boosting memory utilization efficiency.

Figure 4:
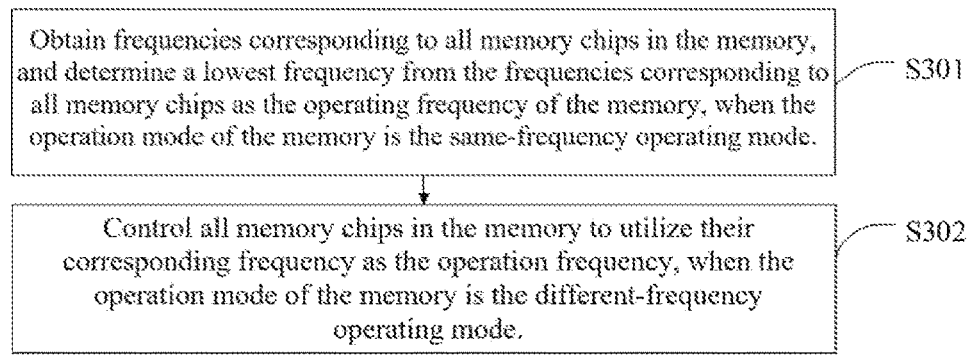
FIG. 4 is a flowchart of the process of adjusting the operating frequency of the memory in the method of adjusting operating frequency of the memory provided by the embodiment of the present disclosure.
Figure 5:
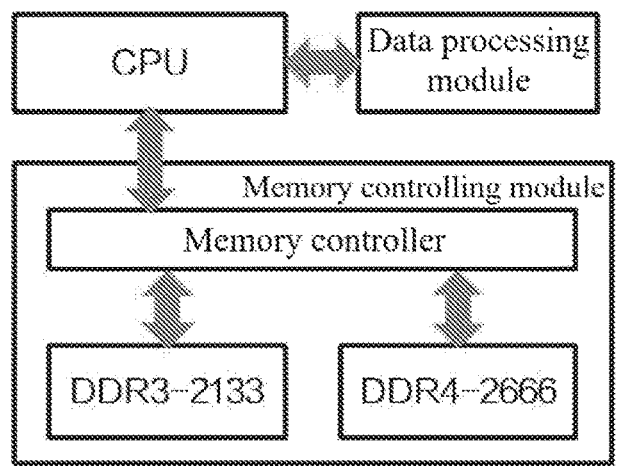
FIG. 5 is a block diagram of a device for adjusting an operating frequency of a memory according to another embodiment of the present disclosure.

In one embodiment, as shown in FIG. 4, step S300 includes S301, S302 and S303.

At step S301, when the operating mode of the memory is the same frequency operating mode, frequencies corresponding to all memory chips in the memory are obtained, and a lowest frequency from the frequencies corresponding to all memory chips is determined as the operating frequency of the memory.

At step S302, when the operating mode of the memory is the different-frequency working mode, all memory chips in the memory utilize their corresponding frequency as the operation frequency.

In this embodiment, the same frequency operating mode means that the terminal system uses the lowest operation frequency of the memory chip to perform memory access operations. The different frequency operating mode means that all memory chips in the memory work with different operation frequencies. Therefore, when the operating mode of the memory in this embodiment is the same frequency operating mode, the frequencies corresponding to all memory chips in the memory are obtained. The lowest frequency selected from the frequencies corresponding to all memory chips is used as the operation frequency of all memory chips in the memory, so as to ensure that the operation frequency of all memory chips in the memory is the same. When the operating mode of the memory is the different frequency operating mode, all memory chips in the memory will use their corresponding frequencies as the operation frequency, so that each memory chip can exert its maximum performance and make full use of memory resources.

For example, as shown in FIG. 6, there are DDR3-2133 model memory chip and DDR4-2666 model memory chip in a memory. The frequency of the DDR3-2133 model memory chip is lower than that of the DDR4-2666 model memory chip. when the operating mode of the memory is the same frequency operating mode, the two models of memory chips are controlled to operate with the frequency of the DDR3-2133 memory chip as the operation frequency. When the operating mode of the memory is different frequency operating mode, the DDR3-2133 model memory chip and the DDR4-2666 model memory chip work with their corresponding frequencies as the operating frequency.

In summary, the present embodiment determines the memory access data of the terminal system according to the operation information of the intelligent terminal. Since the operation information reflects the information generated by the terminal system in the process of operation, it is possible to determine the access speed of the terminal system to the memory during the operation according to the operation information, that is, the memory access data is obtained. Then according to the memory access data, determine the operating mode of the memory, and finally adjust the operating frequency of the memory according to the memory operating mode. Since the operating mode in the present embodiment is determined based on the memory access data, and the memory access data is obtained based on the operation information of the intelligent terminal, it can be seen that the operating mode in the present embodiment is determined according to the operation information generated by the terminal system in the actual operation process. In this way, the operating frequency of the memory is adjusted according to the operating mode, as well as the operating frequency of the memory is adjusted according to the operation information, so as to achieve the effect of dynamically adjusting the operating frequency of the memory, so as to exert the maximum performance of the memory and improve the utilization efficiency of the memory.

Exemplary Device:

As shown in FIG. 6, embodiments of the present disclosure provide an adjusting device for adjusting operating frequency of a memory. The device comprises: a data acquisition unit 10, a mode determination unit 20, a frequency adjustment unit 30. The data acquisition unit 10 is used to determine memory access data of a terminal system according to an operation information of an intelligent terminal. The operation information indicates information generated by the terminal system during operation, and the memory access data indicates an access speed of the terminal system to the memory. The mode determination unit 20 is configured to determine an operation mode of the memory according to the memory access data. The frequency adjustment unit 30 is configured to adjust the operating frequency of the memory according to the operation mode.

Figure 7:
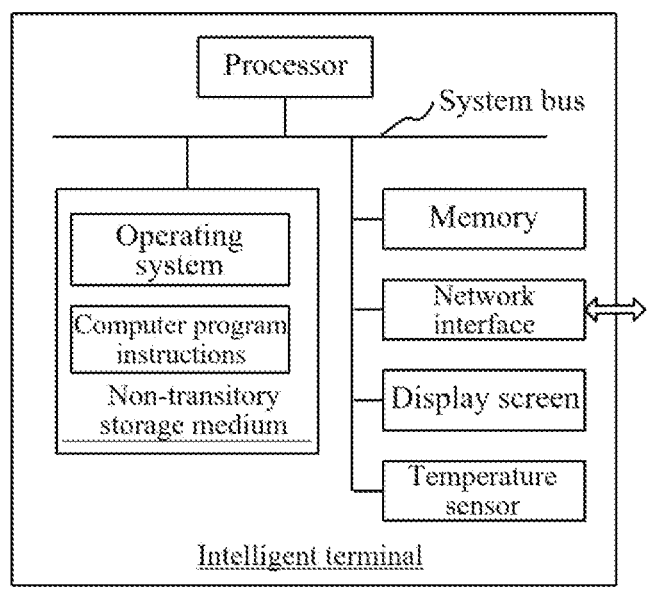
FIG. 7 is a block diagram of the intelligent terminal according to another embodiment of the present disclosure.

Based on the above embodiments, the present disclosure further provides an intelligent terminal. FIG. 7 illustrates a block diagram of the intelligent terminal according to another embodiment of the present disclosure. The intelligent terminal includes a processor, a memory, a network interface, a display, a temperature sensor, all connected through the system bus. The processor of the intelligent terminal is used to provide computing and control capabilities. The memory of the intelligent terminal includes a non-volatile storage medium and an internal memory. This non-volatile storage medium stores an operating system and computer programs. This internal memory provides an environment for the operation of operating systems and computer programs in the non-volatile storage media. The network interface of the intelligent terminal is used to communicate with the external terminal through the network connection. The computer program is executed by the processor when implementing a method of adjusting the operating frequency of the memory. The display screen of the intelligent terminal may be a liquid crystal display (LCD) display or an electronic ink display. The temperature sensor of the intelligent terminal is set in the internal terminal to detect the operating temperature of the internal device.

Those skilled in the art may understand that the block diagram shown in FIG. 7 is only a block diagram of a partial structure related to the present disclosure, and does not constitute a limitation of the intelligent terminal to which the present disclosure scheme is applied. The specific intelligent terminal may include more or fewer components than shown in the figure, or combine certain components, or have different component arrangements.

In one embodiment, an intelligent terminal is provided. The intelligent terminal includes a memory and one or more program instructions. The one or more program instructions stored in the memory executed by one or more processors to perform for performing the following operations:

determining memory access data of a terminal system according to an operation information of an intelligent terminal, where the operation information indicates information generated by the terminal system during operation, and the memory access data indicates an access speed of the terminal system to the memory;

determining an operation mode of the memory according to the memory access data;

adjusting the operating frequency of the memory according to the operation mode.

Those of ordinary skill in the art may understand that the process of implementing all or part of the above embodiment method may be completed by a computer program instructing the relevant hardware. The computer program may be stored in a non-transitory computer-readable storage medium. The computer program may include a process of embodiments such as the above methods when executed. Any reference to memory, storage, database or other media used in each embodiment provided in the present disclosure may include non-volatile or volatile memory. The non-volatile memory may include read-only memory (ROM), programmable ROM (PROM), electrically programmable ROM (EPROM), electrically erasable programmable ROM (EEPROM), or flash memory. The volatile memory includes a random access memory (RAM) or external cache memory. As a description rather than limitation, RAM is available in many forms, such as static RAM (SRAM), dynamic RAM (DRAM), synchronous DRAM (SDRAM), dual data rate SDRAM (DDRSDRAM), enhanced SDRAM (ESDRAM), synchronous link (Synchlink) DRAM (SLDRAM), memory bus (Rambus) direct RAM (RDRAM), Direct memory bus dynamic RAM (DRDRAM), and memory bus dynamic RAM (RDRAM), etc.

In summary, embodiments of the present disclosure are directed to a memory operating frequency adjustment method, intelligent terminal and storage medium. The method comprises: determining memory access data of a terminal system according to an operation information of an intelligent terminal, where the operation information indicates information generated by the terminal system during operation, and the memory access data indicates an access speed of the terminal system to the memory; determining an operation mode of the memory according to the memory access data; and adjusting the operating frequency of the memory according to the operation mode. The present disclosure obtains the memory access data of the terminal system according to the operation information of the intelligent terminal, and then determines the operating mode of the memory according to the memory access data, and finally adjusts the operating frequency of the memory according to the operating mode, so as to maximize the performance of the memory and improve the utilization rate of the memory.

The above are only the preferred embodiments of the present disclosure, and are not intended to limit the scope of the present disclosure. Any equivalent structure or equivalent process transformation made by using the contents of the description and drawings of the present disclosure, or directly or indirectly applied in other related technical fields, are similarly included within the scope of this present disclosure.

What is claimed is:

1. A method of adjusting operating frequency of a memory, comprising:

determining memory access data of a terminal system according to an operation information of an intelligent terminal, wherein the operation information indicates information generated by the terminal system during operation, and the memory access data indicates an access speed of the terminal system to the memory;

determining an operating mode of the memory according to the memory access data; and adjusting the operating frequency of the memory according to the operating mode, wherein determining the operating mode of the memory comprises comparing the memory access data with a same-frequency bandwidth peak speed data indicating a transient access speed of different types of memory chips in the memory under a same operating frequency, and setting the operating mode as a different-frequency operating mode when the memory access data is greater than the same-frequency bandwidth peak speed data, or as a same-frequency operating mode when the memory access data is less than the same-frequency bandwidth peak speed data, and wherein adjusting the operating frequency of the memory comprises controlling all memory chips in the memory to operate with a lowest frequency among the frequencies corresponding to all memory chips when in the same-frequency operating mode, and to operate with their respective frequencies when in the different-frequency operating mode.

2. The method according to claim 1, wherein the determining memory access data of the terminal system according to the operation information of the intelligent terminal, comprises:

acquiring the operation information of the intelligent terminal;

according to the operation information, acquiring a running system task of the terminal system, wherein the system task includes any one or more of application programs, service processes or system functions;

determining a memory access speed data of the terminal system according to the system task.

3. The method according to claim 2, wherein the determining the memory access speed data of the terminal system according to the system task comprises:

obtaining, according to the system task, a peak access speed data corresponding to the system task and the terminal system at startup, wherein the peak access speed data indicates a maximum access speed of the system task and the terminal system to the memory at startup;

obtaining a transient access speed data of the system task to the memory when the terminal system executes the system task; and determining the memory access data according to the peak access speed data and the transient access speed data.

4. The method according to claim 3, wherein the determining the memory access data according to the peak access speed data and the transient access speed data comprises:

summing the peak access speed data and the transient access speed data to obtain the memory access data.

5. The method according to claim 3, wherein the obtaining, according to the system task, the peak access speed data corresponding to the system task and the terminal system at startup, comprises:

obtaining a memory access data table that records peak access speed data corresponding to the application programs, peak access speed data corresponding to the service processes, peak access speed data corresponding to the system functions, and peak access speed data corresponding to the terminal systems;

acquiring the peak access speed data corresponding to the system tasks and the terminal systems from the memory access data table.

6. The method according to claim 5, wherein the acquiring the peak access speed data corresponding to the system tasks and the terminal systems from the memory access data table comprises:

matching the system task with the memory access data table and matching the terminal system with the memory access data table; and acquiring the peak access speed data corresponding to the application program, the service process or the system function in the system task, and the peak access speed data corresponding to the terminal system.

7. The method according to claim 6, wherein the determining the memory access data according to the peak access speed data and the transient access speed data comprises:

summing the peak access speed data and the transient access speed data to obtain the memory access data.

8. The method according to claim 5, before acquiring the memory access data table, further comprising:

reading the peak access speed data of the terminal system to the memory, the peak access speed data of each application program and each service process in the terminal system, and the peak access speed data of the terminal system to the memory when the system function of the terminal system starts;

recording the peak access speed of the terminal system to the memory, the peak access speed data of each application program and each service process in the terminal system, and the peak access speed data of the terminal system to the memory when the system function of the terminal system starts, to form the memory access data table.

9. The method according to claim 1, wherein the determining an operating mode of the memory according to the memory access data comprises:

obtaining a same-frequency bandwidth peak speed data that indicates the transient access speed of different types of memory chips in the memory under the same frequency;

comparing the memory access data with the same-frequency bandwidth peak speed data to determine the operating mode of the memory according to a comparison result.

10. The method according to claim 9, wherein the comparing the memory access data with the same-frequency bandwidth peak speed data to determine the operating mode of the memory according to the comparison result, comprises:

when the memory access data is greater than the same-frequency bandwidth peak speed data, setting the operating mode of the memory to a different frequency operating mode; and when the access data of the memory is less than the peak speed data of the same-frequency bandwidth, setting the operating mode of the memory as the same-frequency operating mode.

11. The method according to claim 10, wherein the adjusting the operating frequency of the memory according to the operating mode comprises:

obtaining frequencies corresponding to all memory chips in the memory, and determining a lowest frequency from the frequencies corresponding to all memory chips as the operating frequency of the memory, when the operating mode of the memory is the same-frequency operating mode; and controlling all memory chips in the memory to utilize their corresponding frequency as the operation frequency, when the operating mode of the memory is the different-frequency operating mode.

12. The method according to claim 11, wherein the memory comprises a first model memory chip and a second model memory chip, and a frequency of the first model memory chip is lower than that of the second model memory chip;

when the obtaining frequencies corresponding to all memory chips in the memory, and determining a lowest frequency from the frequencies corresponding to all memory chips as the operating frequency of the memory, when the operating mode of the memory is the same-frequency operating mode, comprises:

when the operating mode of the memory is the same-frequency operating mode, controlling the first model memory chip and the second model memory chip to operate at the operating frequency that is the frequency of the first model memory chip.

13. The method according to claim 12, wherein the controlling all memory chips in the memory to utilize their corresponding frequency as the operation frequency, when the operating mode of the memory is the different-frequency operating mode comprises:

when the operating mode of the memory is the different-frequency operating mode, controlling the first model memory chip and the second model memory chip to operate with their corresponding frequency as the operating frequency.

14. An intelligent terminal comprising a memory and one or more program instructions, wherein the one or more program instructions stored in the memory executed by one or more processors to perform operations comprising:

determining memory access data of a terminal system according to an operation information of an intelligent terminal, wherein the operation information indicates information generated by the terminal system during operation, and the memory access data indicates an access speed of the terminal system to the memory;

determining an operating mode of the memory according to the memory access data; and adjusting the operating frequency of the memory according to the operating mode;

wherein determining the operating mode of the memory comprises comparing the memory access data with a same-frequency bandwidth peak speed data indicating a transient access speed of different types of memory chips in the memory under a same operating frequency, and setting the operating mode as a different-frequency operating mode when the memory access data is greater than the same-frequency bandwidth peak speed data, or as a same-frequency operating mode when the memory access data is less than the same-frequency bandwidth peak speed data, and wherein adjusting the operating frequency of the memory comprises controlling all memory chips in the memory to operate with a lowest frequency among the frequencies corresponding to all memory chips when in the same-frequency operating mode, and to operate with their respective frequencies when in the different-frequency operating mode.

15. A non-transitory computer-readable storage media, storing program instructions executable by a processor of an electronic device to perform operations comprising:
determining memory access data of a terminal system according to an operation information of an intelligent terminal, wherein the operation information indicates information generated by the terminal system during operation, and the memory access data indicates an access speed of the terminal system to the memory;
determining an operating mode of the memory according to the memory access data; and
adjusting the operating frequency of the memory according to the operating mode;
wherein determining the operating mode of the memory comprises comparing the memory access data with a same-frequency bandwidth peak speed data indicating a transient access speed of different types of memory chips in the memory under a same operating frequency, and setting the operating mode as a different-frequency operating mode when the memory access data is greater than the same-frequency bandwidth peak speed data, or as a same-frequency operating mode when the memory access data is less than the same-frequency bandwidth peak speed data, and wherein adjusting the operating frequency of the memory comprises controlling all memory chips in the memory to operate with a lowest frequency among the frequencies corresponding to all memory chips when in the same-frequency operating mode, and to operate with their respective frequencies when in the different-frequency operating mode.

16. The intelligent terminal according to claim 14, wherein the determining memory access data of the terminal system according to the operation information of the intelligent terminal, comprises:
acquiring the operation information of the intelligent terminal;
according to the operation information, acquiring a running system task of the terminal system, wherein the system task includes any one or more of application programs, service processes or system functions;
determining a memory access speed data of the terminal system according to the system task.

17. The intelligent terminal according to claim 16, wherein the determining the memory access speed data of the terminal system according to the system task comprises:
obtaining, according to the system task, a peak access speed data corresponding to the system task and the terminal system at startup, wherein the peak access speed data indicates a maximum access speed of the system task and the terminal system to the memory at startup;
obtaining a transient access speed data of the system task to the memory when the terminal system executes the system task; and
determining the memory access data according to the peak access speed data and the transient access speed data.

18. The intelligent terminal according to claim 17, wherein the determining the memory access data according to the peak access speed data and the transient access speed data comprises:
summing the peak access speed data and the transient access speed data to obtain the memory access data.

19. The intelligent terminal according to claim 17, wherein the obtaining, according to the system task, the peak access speed data corresponding to the system task and the terminal system at startup, comprises:
obtaining a memory access data table that records peak access speed data corresponding to the application programs, peak access speed data corresponding to the service processes, peak access speed data corresponding to the system functions, and peak access speed data corresponding to the terminal systems;
acquiring the peak access speed data corresponding to the system tasks and the terminal systems from the memory access data table.

* * * * *